(12) United States Patent
Noonan

(10) Patent No.: US 8,869,744 B2
(45) Date of Patent: Oct. 28, 2014

(54) METHOD OF FOLDING SUBSTANTIALLY SMALLER A DISPOSABLE CAT LITTER HOLDING MEANS

(76) Inventor: Wallace E. Noonan, Allentown, NJ (US)

( * ) Notice: Subject to any disclaimer, the term of this patent is extended or adjusted under 35 U.S.C. 154(b) by 255 days.

(21) Appl. No.: 13/374,835

(22) Filed: Jan. 17, 2012

(65) Prior Publication Data

US 2012/0186527 A1    Jul. 26, 2012

Related U.S. Application Data

(60) Provisional application No. 61/461,849, filed on Jan. 24, 2011.

(51) Int. Cl.
| | | |
|---|---|---|
| A01K 29/00 | (2006.01) | |
| B65D 5/30 | (2006.01) | |
| A01K 1/01 | (2006.01) | |
| B65D 5/42 | (2006.01) | |

(52) U.S. Cl.
CPC ................ A01K 1/0125 (2013.01); B65D 5/42 (2013.01)
USPC .......................................... 119/168; 229/170

(58) Field of Classification Search
USPC ............................ 119/165, 168; 229/169, 170
See application file for complete search history.

(56) References Cited

U.S. PATENT DOCUMENTS

| | | | |
|---|---|---|---|
| 886,308 | A | 4/1908 | Reynolds |
| 2,193,925 | A | 3/1940 | Huye |
| 2,339,382 | A | 1/1944 | Davidson |
| 2,784,900 | A | 3/1957 | Baner |
| 2,970,741 | A | 2/1961 | Stone et al. |
| 3,154,052 | A | 10/1964 | Sweeney |
| 3,639,937 | A | 2/1972 | Sweeney |
| 3,684,155 | A | 8/1972 | Smith |
| 3,743,170 | A * | 7/1973 | Riccio ........................... 229/144 |
| 3,886,901 | A | 6/1975 | Zeitter |
| 4,068,795 | A | 1/1978 | Foster |
| 4,164,314 | A | 8/1979 | Edgar |
| 4,192,445 | A | 3/1980 | Card |
| 4,206,868 | A | 6/1980 | Stephens |
| 4,238,069 | A | 12/1980 | Morris, Jr. |
| 4,305,544 | A | 12/1981 | Noonan |
| 4,306,658 | A | 12/1981 | Montealegre |
| 4,308,957 | A | 1/1982 | Ward |
| 4,441,451 | A | 4/1984 | Neal |
| 4,501,226 | A | 2/1985 | Bienvenu et al. |
| 4,548,160 | A | 10/1985 | Feitelson |

(Continued)

FOREIGN PATENT DOCUMENTS

FR    2608012 A1 *  6/1988  .............. A01K 1/01

*Primary Examiner* — Son T Nguyen

(57) ABSTRACT

A combination structural addition for folding a disposable cat box smaller for packaging. In addition to the prior art die-cuts and fold-line creases enabling the box structures to be folded smaller for packaging, a new embodiment of fold-line creases is added comprising the combination of folding in both directions along at least one longitudinal and transversal fold-line crease across a length and width of the paperboard blank; the fold-line creases being located in the approximate center of the blank and intersecting in the approximate center of the bottom means of the blank. This new embodiment enables the folded box when combined with prior art folds to be further book folded approximately in-half in both directions along said longitudinal and transversal fold-line creases to enable the folded box to occupy a cubic area about one-tenth the area of the erected box.

2 Claims, 11 Drawing Sheets

(56) References Cited

U.S. PATENT DOCUMENTS

| | | | | |
|---|---|---|---|---|
| 4,561,587 A | | 12/1985 | Wysocki | |
| 4,624,380 A | * | 11/1986 | Wernette | 119/168 |
| 4,628,863 A | | 12/1986 | Eichenauer | |
| 4,646,685 A | | 3/1987 | Arenz | |
| 4,648,349 A | | 3/1987 | Larson | |
| 4,706,606 A | | 11/1987 | Coppola | |
| 4,763,603 A | * | 8/1988 | Coes | 119/168 |
| 4,791,883 A | | 12/1988 | Lehman et al. | |
| 4,800,842 A | | 1/1989 | Jones, Jr. | |
| 4,807,563 A | | 2/1989 | Berry et al. | |
| 4,807,564 A | | 2/1989 | Soberg et al. | |
| 4,813,376 A | | 3/1989 | Kaufman et al. | |
| 4,865,371 A | | 9/1989 | Egberg | |
| 4,890,576 A | | 1/1990 | James | |
| D309,050 S | | 7/1990 | Wolak | |
| 4,940,016 A | | 7/1990 | Heath | |
| 4,967,692 A | | 11/1990 | Mills | |
| 4,979,669 A | | 12/1990 | Kerton | |
| 4,986,217 A | | 1/1991 | Robinson et al. | |
| 5,035,205 A | | 7/1991 | Schiller et al. | |
| 5,046,457 A | | 9/1991 | Ashcroft et al. | |
| 5,060,849 A | * | 10/1991 | King | 229/101 |
| 5,078,099 A | * | 1/1992 | Balson | 119/168 |
| 5,080,044 A | * | 1/1992 | Bosworth | 119/168 |
| 5,129,364 A | * | 7/1992 | Pirkle | 119/167 |
| 5,134,974 A | | 8/1992 | Houser | |
| 5,144,914 A | | 9/1992 | Giannakopoulos | |
| 5,172,652 A | | 12/1992 | DoBrin | |
| 5,211,134 A | * | 5/1993 | Bolo, III | 119/168 |
| 5,249,549 A | | 10/1993 | Rockaitis, III | |
| 5,249,550 A | | 10/1993 | Hines et al. | |
| 5,251,573 A | | 10/1993 | Bremley | |
| 5,294,043 A | | 3/1994 | Platt | |
| 5,359,960 A | * | 11/1994 | Yananton | 119/165 |
| 5,394,834 A | | 3/1995 | Queen et al. | |
| 5,396,864 A | | 3/1995 | Mannschreck | |
| 5,488,930 A | | 2/1996 | Kasbo et al. | |
| 5,615,639 A | | 4/1997 | Knight | |
| 5,645,212 A | | 7/1997 | Potter | |
| 5,655,479 A | | 8/1997 | Armington et al. | |
| 5,673,849 A | | 10/1997 | Stone | |
| 5,685,259 A | | 11/1997 | Santioemmo | |
| 5,730,085 A | | 3/1998 | Santioemmo | |
| 5,765,504 A | | 6/1998 | Evans et al. | |
| 5,780,385 A | | 7/1998 | Santioemmo | |
| 5,830,765 A | | 11/1998 | Santioemmo | |
| 5,845,601 A | | 12/1998 | Robinson | |
| 5,865,140 A | | 2/1999 | McGivern | |
| 5,878,693 A | | 3/1999 | Green | |
| 5,881,949 A | | 3/1999 | Focke | |
| 5,913,282 A | | 6/1999 | Indes et al. | |
| 6,065,429 A | | 5/2000 | Crosse | |
| 6,382,131 B1 | | 5/2002 | McGivern | |
| 6,698,382 B1 | | 3/2004 | Blazak et al. | |
| 6,866,189 B2 | | 3/2005 | Nelson | |
| 7,118,610 B2 | | 10/2006 | Lipner | |
| 2004/0200890 A1 | * | 10/2004 | Mesly | 229/101 |
| 2004/0244708 A1 | * | 12/2004 | Neil et al. | 119/168 |
| 2012/0234252 A1 | * | 9/2012 | Donta et al. | 119/168 |

\* cited by examiner

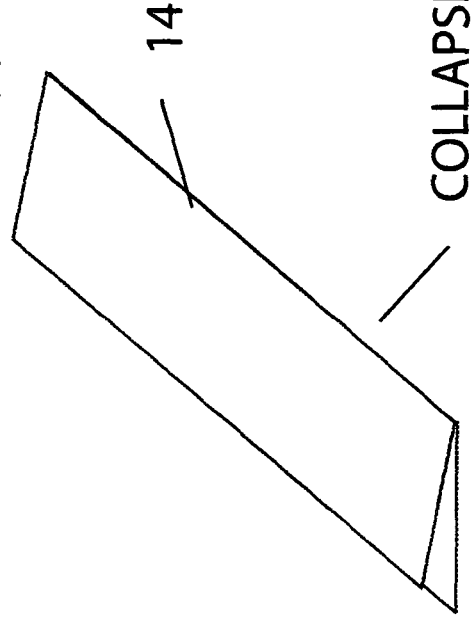
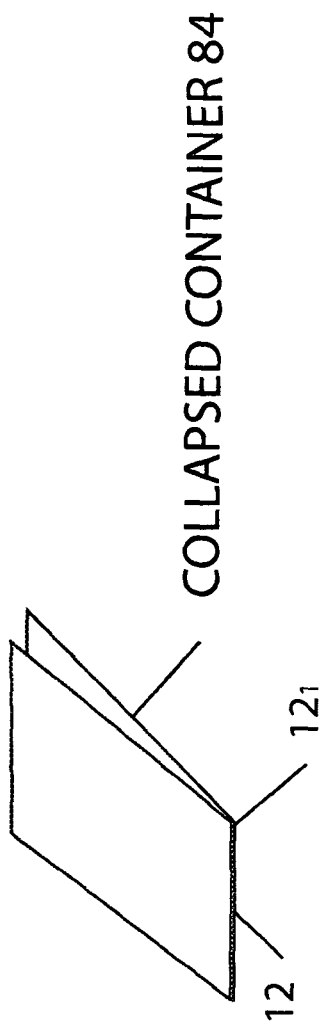

Folded Collapsed Container 84

METHOD OF FOLDING SUBSTANTIALLY SMALLER A DISPOSABLE CAT LITTER HOLDING MEANS

CROSS REFERENCE TO RELATED APPLICATIONS

Provisional Patent Application No. 61/461,849
Filing Date: Jan. 24, 2011

BACKGROUND OF THE INVENTION

1) Field of the Invention

This invention relates to the field of paperboard disposable cat litter boxes, and particularly to a structural addition for folding the disposable cat box smaller for packaging in order to stock a multitude of folded boxes onto a small area of retail shelf space.

2) Description of Prior Art

Cleaning conventional, re-usable cat boxes, or cleaning the attachments of automatic cleaning cat boxes continues to be a dirty, messy, and smelly task. To eliminate this unpleasant duty, many inventors have been awarded hundreds of patents for disposable cat litter holding means such as boxes, or trays, or the like, for the sanitary needs of cats where the pet owner can merely throw the entire used disposable cat litter holding means away, and open up a new one. Many pet owners would prefer that the disposable holding means be made of a recycled and biodegradable paperboard material for ecological benefits. However, only a few of the hundreds of patented disposable cat litter holding means are marketed on store shelves for sale to those pet owners who would prefer the ease and convenience of not having to clean a conventional re-usable cat box, or to clean the attachments of automatic cleaning cat boxes.

Past concepts of utility design for a multitude of patented disposable cat litter holding means such as a box, or tray, or the like, have created mass merchandising retail marketing problems for stocking these holding means onto allotted, precious and costly retail shelf space. One problem is that most of the folded holding means are sold containing cat litter, or a cat litter substitute, requiring some to have a folded packaged physical size of approximately 50% of the size of a fully erected holding means. These disposable holding means are not designed for stocking a multitude of holding means onto a square foot of retail shelf space, because their large packaged size restricts the stores to only be able to put a few on the shelf, requiring store personnel to re-stock the shelf more often at an additional cost to the retail store. Another problem is their large packaged size prevents the stores from making more income retailing additional products on the shelf. Another problem is the folded disposable holding means are too large to be inserted or carried in a standard supermarket size shopping bag, making it inconvenient and cumbersome for the shopper to have to handle them separately.

To overcome the problem of only being able to stock a few disposable cat litter holding means onto a retail shelf space, two styles of disposable holding means that are currently being marketed in the stores are a full size erected molded tray manufactured in a paper type product, and a full size erected plastic injected molded tray.

Both types of trays have opposing vertical end walls and opposing vertical side walls that are tapered outward from their integral horizontal bottom panel or bottom wall to the top of their end walls and side walls permitting the trays to be nested, one tray inside another tray. This permits the store personnel to stack a reasonable number of nested trays on the shelf at one time for sale, and reduces the amount of times the shelf has to be re-stocked. U.S. Pat. No. 4,716,853 to d'Aniello, Jan. 5, 1988, illustrates the plastic injection molded tray and U.S. Pat. No. 5,172,652 to Dobrin et al, Dec. 22, 1992, illustrates the molded paper product tray. However, these packaged molded trays are fully erected and too large to fit a multitude of trays onto one square foot of retail shelf space, and are too large to be inserted or carried in a standard supermarket size plastic shopping bag, making them inconvenient and cumbersome for the shopper to handle separately.

When we examine patents of disposable cat litter holding means that are folded smaller than their full erected size for stocking on retail shelf space, and are not sold containing cat litter or a cat litter substitute within the folded holding means, and are manufactured from a one-piece, integral, flat, die-cut and fold-line creased paperboard blank, I am not aware of existing prior art that uses a combination structural addition for folding the disposable holding means in both directions, so that when completely folded by combining with the preceding prior art folds, enables a multitude of folded holding means to be stocked onto a square foot of retail shelf space, or for the folded holding means to be inserted or carried in a standard supermarket size shopping bag.

U.S. Pat. No. 3,684,155 to Smith "Collapsible Sanitary Container and Container Liner" shows a one-piece, integral, die-cut and fold-line creased paperboard blank manufactured and assembled into a collapsible container where the opposing end walls transversal fold-line creases are located where the horizontal bottom means such as a bottom panel or bottom wall is attached to the opposing end walls and where the opposing side walls longitudinal fold-line creases are located where the horizontal bottom means is attached to the opposing side walls and where diagonal fold-line creases on the opposing corner end wall flaps that are secured with an adhesive to the opposing adjacent side walls enable the opposing side walls and opposing end walls to be folded inwardly for an extended length, over and parallel to the bottom means such as a bottom panel or bottom wall for a smaller folded size. In addition, the patent has two transversal fold-line creases across the entire width of the blank and located in the center, or approximate center of the blank to enable the folded collapsed container to be folded in-half longitudinally to make the folded collapsed container smaller for packaging. However, drawing FIGS. 3 and 5 of the patent illustrate there are no reductions of the width size of the bottom means in the folded collapsed container, because the patent does not fold the holding means in both directions for much smaller folded dimensions. Understanding, a horizontal bottom means should be at least 15.5" wide across the bottom to handle most sizes of cats, the folded holding means width would require too much retail shelf space and also be unable to be inserted or carried in a standard supermarket size shopping bag making it inconvenient and cumbersome for the shopper to carry the holding means separately.

U.S. Pat. No. 4,305,544 to Noonan "Disposable Cat Litter Holding Means" shows the one-piece, integral, die-cut and fold-line creased paperboard blank where opposing upper end wall members including their attached securing means are hinged by transversal fold-line creases to the upper opposing end walls and where the lower opposing end walls are hinged by transversal fold-line creases to the ends of the horizontal bottom means. The opposing upper side wall members including their integral securing means are hinged by longitudinal fold-line creases to the upper opposing side walls and the lower opposing side walls are hinged by longitudinal fold-lines creases to the sides of the horizontal bottom means. The opposing corner end wall flaps including their securing means are hinged by transversal fold-line creases to the ends of the opposing side walls. The die-cut means located between the opposing corner end wall flaps and the opposing end walls and opposing upper end wall members separates the opposing corner end wall flaps from the opposing end walls and opposing upper end wall members. These die-cut means along with the transversal and longitudinal fold-line creases enable the paperboard blank to be folded smaller for packaging.

However, the folded holding means does not reduce either the width or the length of the horizontal bottom means of the blank requiring too much retail shelf space for the folded holding means, and the folded holding means is too large to be inserted or carried in a standard supermarket size shopping bag making it inconvenient and cumbersome for the shopper to have to carry the holding means separately.

U.S. Pat. No. 5,115,766 to Williams "Disposable Litter Box" uses two or three separate die-cut and fold-line creased paperboard embodiments to erect one non-integral disposable cat litter holding means such as a litter box. In drawing FIGS. 1, 2, 3 & 4, of the patent, the die-cut and creased paperboard's opposing end walls and attached end wall stiffeners, and the opposing side walls and attached side wall stiffeners use longitudinal fold-line creases in the longitudinal center of each end wall and each integral end wall stiffener, and transversal fold-line creases in the center of each side wall and each integral side wall stiffener in order to fold the end walls and integral end wall stiffeners, side walls and integral side wall stiffeners smaller for packaging as illustrated in drawing FIGS. 8, 11, 12 & 14 of the patent. In drawing FIG. 10, the patent shows an embodiment with a separate bottom panel that has a longitudinal fold-line crease in the center of the bottom panel intersecting in the center of the bottom panel with a transversal fold-line crease in order to fold the bottom panel smaller for packaging as illustrated in drawing FIG. 13. Also, in drawing FIG. 10, the patent shows another embodiment comprising a die-cut and fold-line creased outer side wall and end wall support assembly fitted around the periphery of the plastic bag to confine the plastic bag wrap around the periphery of the inner side wall and end wall assembly. The separate end wall and side wall support assembly also has a longitudinal fold-line crease in the center of each end wall and a transversal fold-line increase in the center of each side wall in order to fold the opposing end walls and opposing side walls smaller for packaging. However, the patent requires folding two or three embodiments comprising separate die-cut and fold-line creased paperboard blanks to form one non-integral disposable cat litter holding means such as a box, which will require more retail shelf space.

In conclusion, insofar as I am aware the present invention provides a means for overcoming these prior art difficulties.

SUMMARY OF THE INVENTION

A combination structural addition for folding substantially smaller for packaging, a disposable cat litter holding means and when erected is used for the sanitary needs of domestic house pets, preferably cats. In addition to the prior art die-cuts and fold-line creases enabling the holding means structures to be folded inwardly for an extended length over and parallel to their horizontal bottom means for folding the holding means smaller for packaging, a new embodiment of fold-line creases is added comprising the combination of folding in both directions along one or more longitudinal and transversal fold-line creases across a length and width of a paperboard blank; the fold-line creases being located in the center, or approximate center of the blank, and intersecting in the center, or approximate center of the preferably rectangular bottom means such as a bottom panel or bottom wall of the blank, to enable the folded holding means when combined with preceding prior art folds to be further book folded in-half or approximately in-half transversally along the one or more longitudinal fold-line creases, and further book folded in-half or approximately in-half longitudinally along the one or more transversal fold-line creases to enable the folded holding means to occupy a cubic area about one-tenth the cubic area occupied by the disposable cat litter holding means when fully erected, depending on the erected size of the holding means, and enabling a multitude of completely folded holding means to be stocked onto one-square foot of shelf space.

OBJECTS OF THE INVENTION

It is an object of the present invention to provide the method of folding substantially smaller for packaging, an unassembled or assembled paperboard disposable cat litter holding means such as a box, or tray, or the like, for the sanitary needs of domestic house pets, preferably cats, which when erected are filled with cat litter, or a cat litter substitute.

It is an object of the present invention to provide the method of folding substantially smaller for packaging, an unassembled or assembled paperboard disposable cat litter holding means such as a box, or tray, or the like, that when the method of folding in both directions is combined with preceding prior art folds, enables the completely folded holding means to occupy a space about one-tenth the space of a fully erected disposable cat litter holding means such as a box or tray or the like, depending on the size of the erected holding means.

It is an object of the present invention to provide the method of folding substantially smaller for packaging, an unassembled or assembled paperboard disposable cat litter holding means such as a box, or tray, or the like, that when the method of folding in both directions is combined with preceding prior art folds, enables a multitude of completely folded holding means to be stocked onto one square foot of retail shelf space.

It is an object of the present invention to provide the method of folding substantially smaller for packaging, an unassembled or assembled paperboard disposable cat litter holding means such as a box, or tray, or the like, that when the method of folding in both directions is combined with preceding prior art folds, enables the completely folded holding means to be inserted or carried in a standard supermarket size shopping bag, making it easier and convenient for the shopper to carry the completely folded holding means within the shopping bag instead of having to carry it separately.

It is an object of the present invention to provide the method of folding substantially smaller for packaging, an unassembled paperboard disposable cat litter holding means such as a box, or tray, or the like, which is assembled and erected by the pet owner into a box or tray or the like, for the sanitary needs of domestic house pets, preferably cats.

It is an object of the present invention to provide the method of folding substantially smaller for packaging, an assembled paperboard disposable cat litter holding means such as a collapsible container, which is opened and erected by the pet owner into a box or tray, or the like, for the sanitary needs of domestic house pets, preferably cats.

It is an object of the present invention to provide the method of folding substantially smaller for packaging, an unassembled or assembled paperboard disposable cat litter holding means that are preferably waterproof coated, or have a plastic laminate, or a plastic sheet, or a plastic bag to provide waterproofing to the paperboard, so that when the holding means is erected into a box or tray or the like, the wet cat litter is in contact with the waterproofing means.

It is an object of the present invention to provide the method of folding substantially smaller for packaging, an unassembled or assembled paperboard disposable cat litter holding means such as a box, or tray, or the like that are preferably made of recycled and biodegradable paperboard for ecological benefits.

It is an object of the present invention to provide the method of folding substantially smaller for packaging, an unassembled or assembled paperboard disposable cat litter holding means such as a box, or tray, or the like, that when the method of folding in both directions is combined with preceding prior art folds, the completely folded holding means is sold not containing cat litter or a cat litter substitute within the folded holding means, but rather the pet owner adds the cat litter or cat litter substitute after the completely folded holding means has been unfolded and erected into a box or tray or the like.

It is an object of the present invention to provide the method of folding substantially smaller for packaging, an unassembled or assembled disposable paperboard cat litter holding means such as a box, or tray, or the like, which is of minimal expense and as such can be feasibly used in a complete disposable fashion.

BRIEF DESCRIPTION OF THE DRAWINGS

While the invention is particularly pointed out and distinctly claimed in the concluding portions herein, a preferred embodiment is set forth in the following detailed description, which may be best understood when read in connection with the accompanying drawings in which:

FIG. 9A, illustrates FIG. 8, using the embodiment being folded in-half transversally.

FIG. 9B, illustrates FIG. 9A, using the embodiment being folded in-half longitudinally.

DETAILED DESCRIPTION OF THE PREFERRED EMBODIMENT

Figure 1:
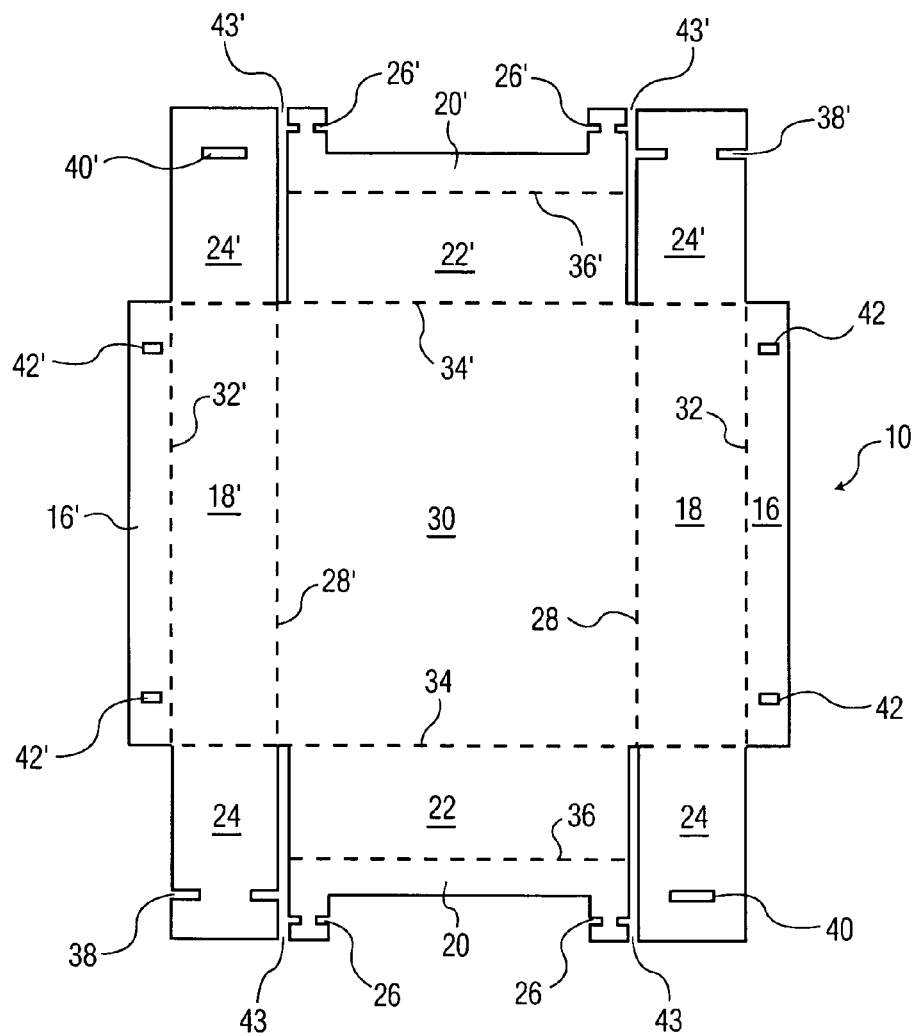
FIG. 1, illustrates prior art of an unassembled one-piece, integral, flat, die-cut and fold-line creased paperboard blank.

In FIG. 1, the prior art shows a top-view of the one-piece, integral, die-cut and fold-line creased paperboard blank 10, before being folded into a smaller size for packaging. The blank 10 is composed of a bottom means such as a bottom wall or bottom panel 30 whose longitudinal edges are hinged by fold line creases 28, 28$^1$ to the opposing side walls 18, 18$^1$ whose opposing upper side wall edges are hinged by fold-line creases 32, 32$^1$ to the opposing upper side wall members 16, 16$^1$ which include opposing upper member securing devices 42, 42$^1$. The bottom wall 30 is also composed of transversal edges that are hinged by fold-line creases 34, 34$^1$ to opposing end walls 22, 22$^1$ whose opposing upper end wall edges are hinged by fold-line creases 36, 36$^1$ to the opposing upper end wall members 20, 20$^1$. The opposing corner end flaps 24, 24$^1$ including their opposing securing devices 38, 38$^1$, 40, 40$^1$ have their inner longitudinal edges separated from the opposing end walls 22, 22$^1$, opposing upper end wall members 20, 20$^1$ and the opposing upper end wall members securing devices 26, 26$^1$ by opposing die-cuts 43, 43$^1$, and the opposing corner end flaps 24, 24$^1$ transversal edges are hinged by transversal fold-line creases 34, 34$^1$ to the opposing side walls 18, 18$^1$.

Figure 2A:
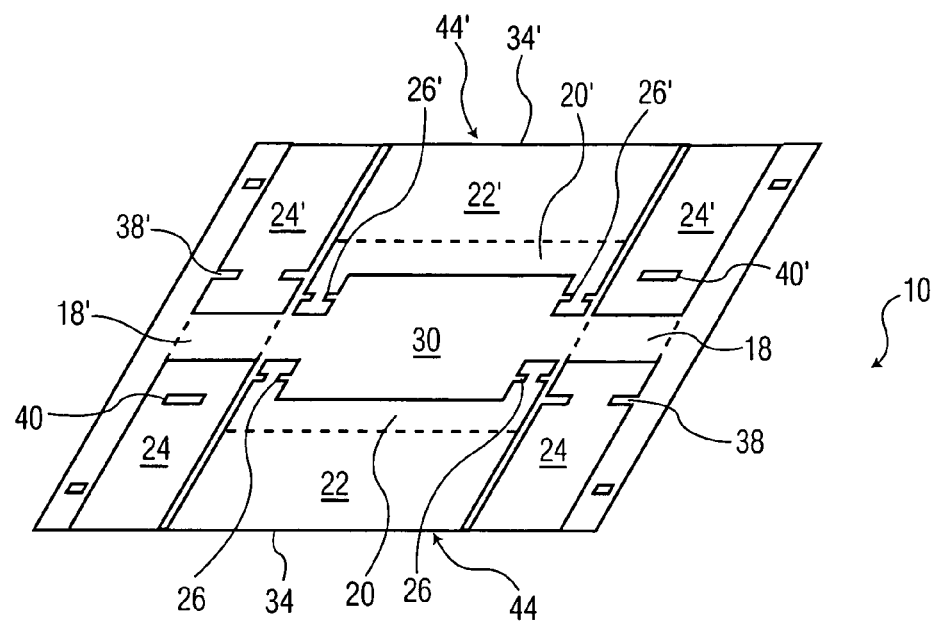
FIG. 2A, illustrates preliminary folding of FIG. 1, without the embodiment added.

FIG. 2A illustrates the preliminary folding of the one-piece, integral, die-cut and fold-line creased paperboard blank 10 in drawing FIG. 1. The corner end flaps 24 including their securing devices 38, 40 are folded inwardly along transversal fold-line crease 34 over and parallel the opposing side walls 18, 18$^1$ to cover an extended length of the opposing side walls 18, 18$^1$. The end wall 22, upper end wall member 20, and upper end wall member securing devices 26 are folded inwardly along transversal fold-line crease 34 over and parallel the bottom wall 30 to cover an extended length of the bottom wall 30 to form along with the folded corner end flaps 24 the folded portion 44. Opposing corner end flaps 24$^1$ including their securing devices (38$^1$, 40$^1$) are folded inwardly along transversal fold-line crease (34$^1$) over and parallel the opposing side walls 18, 18$^1$. The opposing end wall 22$^1$, opposing upper end wall member 20$^1$, opposing upper end wall member securing device 26$^1$ are folded inwardly along opposing transversal fold-line crease 34$^1$ over and parallel the bottom wall 30 to cover an extended length of the bottom wall 30 to form along with the folded opposing corner end flaps 24$^1$ the opposing folded portion 44$^1$.

Figure 2B:
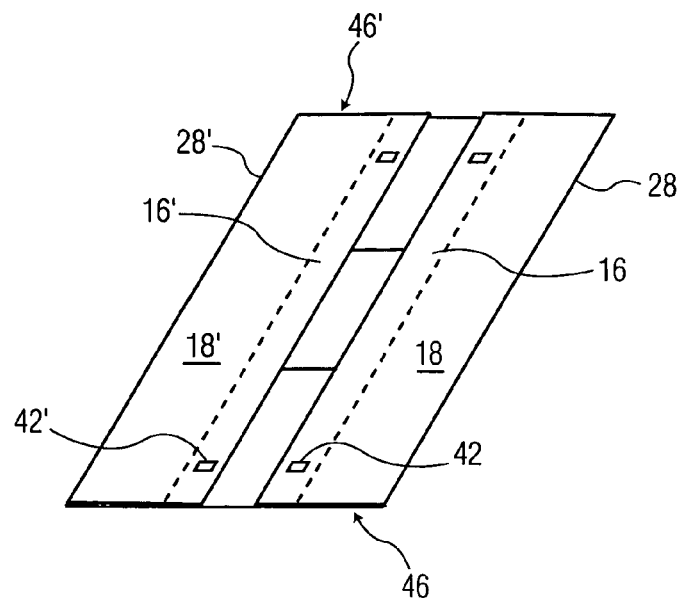
FIG. 2B, illustrates final folding FIG. 2A smaller, without the embodiment added.

FIG. 2B illustrates folding the preliminary fold in FIG. 2A, smaller, comprising side wall 18 including upper side wall member 16, securing device 42 and opposing folded corner end flaps 24, 24$^1$ (not visible) being folded inwardly along longitudinal fold-line crease 28 over and parallel an extended length of opposing form folded portions 44, 44$^1$ to form folded portion 46. The opposing side wall 18$^1$ including opposing upper side wall member 16$^1$, opposing securing device 42$^1$ and opposing folded corner end flaps 24, 24$^1$ (not visible) are folded inwardly along longitudinal fold-line crease 28$^1$ over and parallel an extended length of the opposing form folded portions 44, 44$^1$ to form folded portion 46$^1$.

Figure 3:
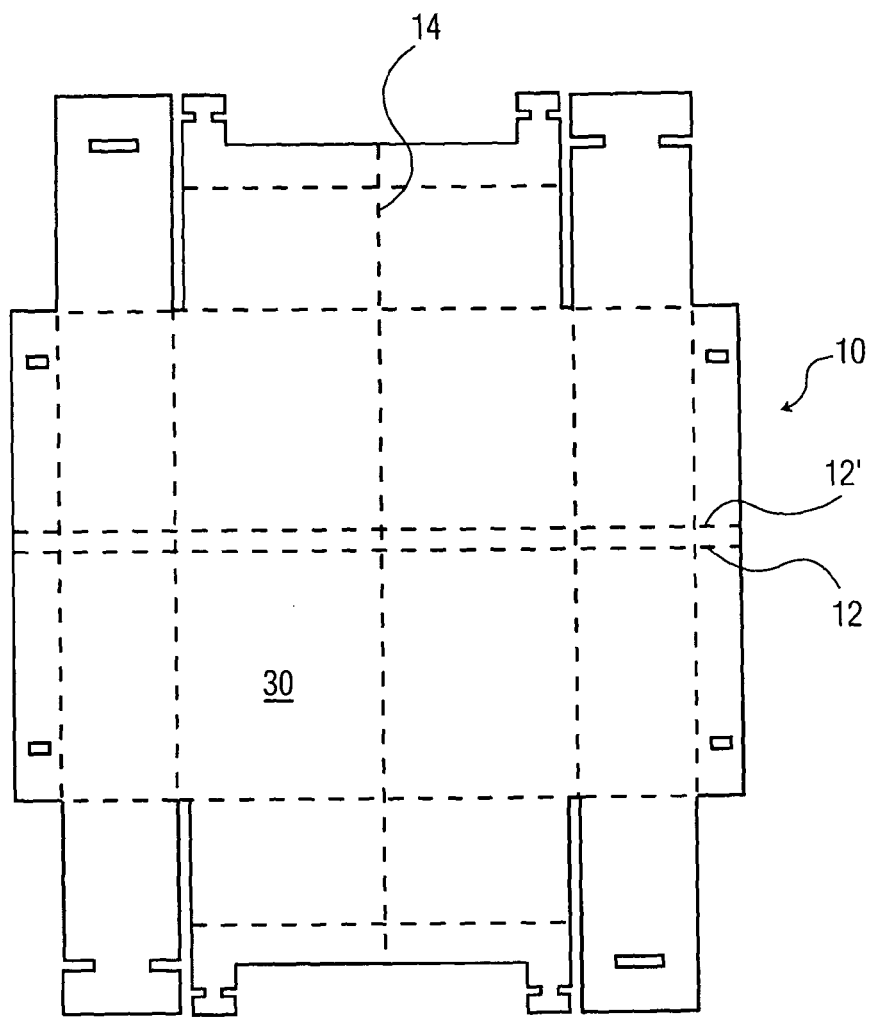
FIG. 3, illustrates the embodiment of the invention added to FIG. 1A.

FIG. 3 illustrates the one-piece, integral, die-cut and fold-line creased paperboard blank 10 as shown in drawing FIG. 1, with the embodiment of the invention added consisting of the combination of one or more longitudinal fold-line creases 14 and one or more transversal fold-line creases 12, 12$^1$ across a length and width of the blank 10 with the fold-line creases 14, 12, 12$^1$ being located in the center, or approximate center of the blank 10 and intersecting in the center, or approximate center of the bottom wall 30 of the blank 10.

Figure 4A:
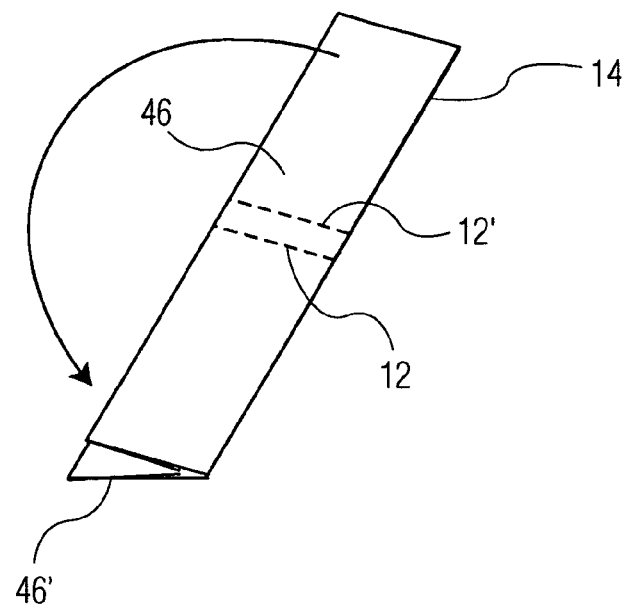
FIG. 4A, illustrates FIG. 3, using the embodiment being folded in-half transversally.

FIG. 4A shows how the combination of the embodiment in FIG. 3 enables the folded portions 46, 46$^1$ in FIG. 2B to be folded in-half or approximately in-half transversally by folding folded portion 46 along longitudinal fold-line crease 14 inwardly over and parallel opposing folded portion 46$^1$ to form a book folded portion 48 that is one-half, or approximately one-half the width of the combined folded portions 46, 46¹.

Figure 4B:
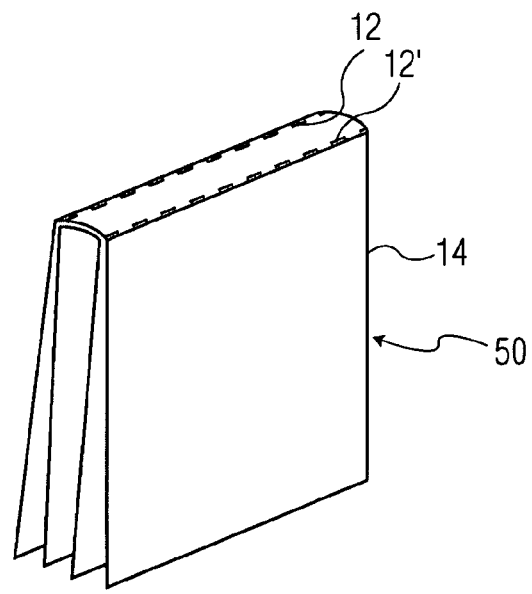
FIG. 4B, illustrates FIG. 4A, using the embodiment being folded in-half longitudinally.

FIG. 4B shows how the embodiment in FIG. 3 enables the folded portion 48 in FIG. 4A to be further folded in-half or approximately in-half longitudinally by folding along transversal fold line creases 12, 12¹ to form a substantially smaller book folded portion 50 that is one-half, or approximately one-half the size of folded portion 48.

Figure 5:
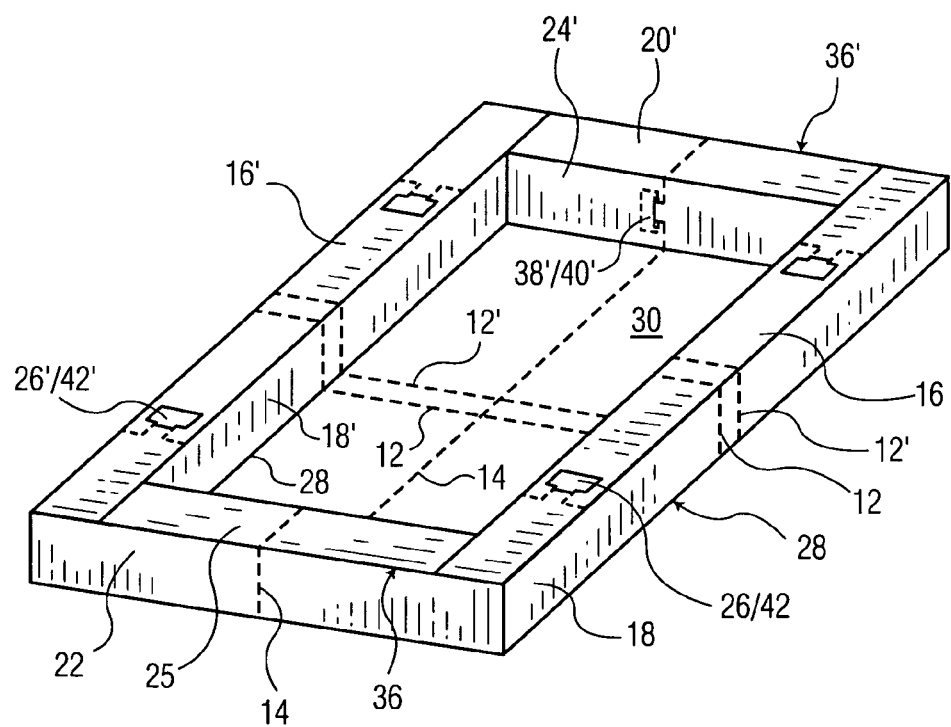
FIG. 5, illustrates FIG. 4B, completely folded for packaging.

FIG. 5 illustrates FIG. 4B using the embodiment's two transversal fold-line creases 12, 12¹ spaced close to one another, that is less than one-inch apart, in such a manner as to facilitate ease of folding folded portion 48 itself into completely folded package identified as folded portion 50.

Figure 6:
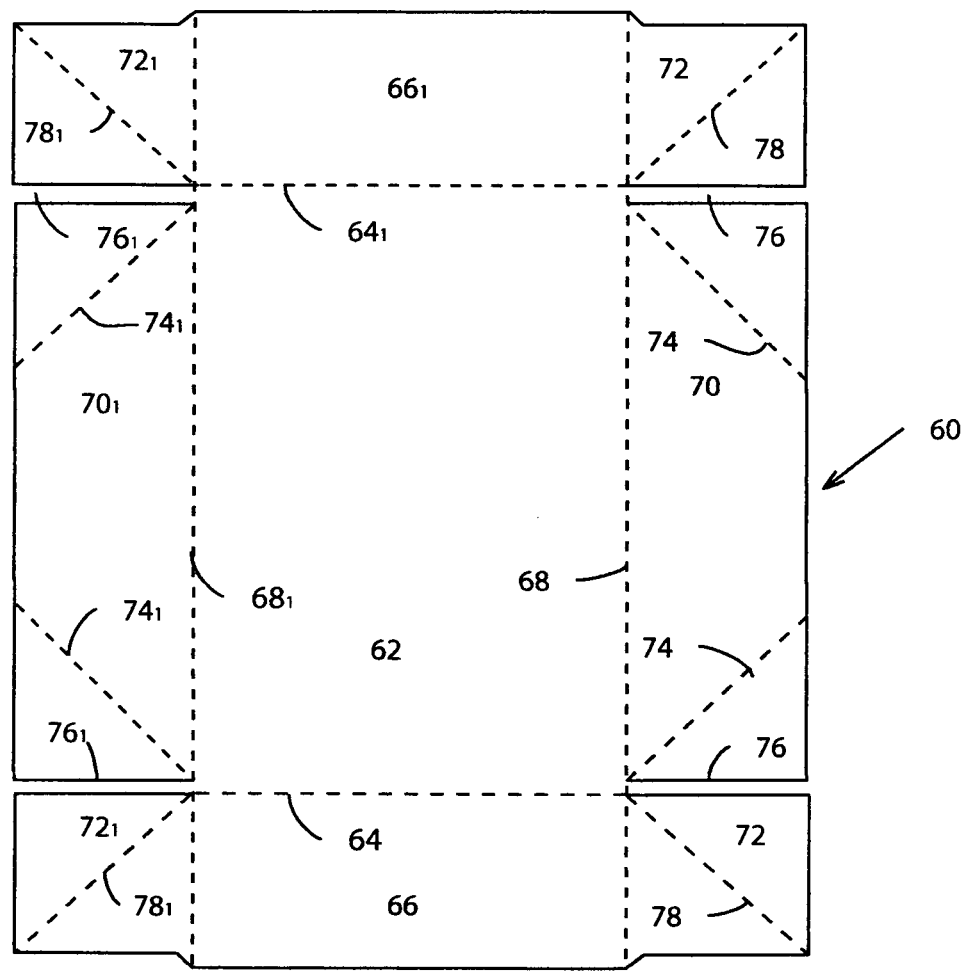
FIG. 6, illustrates prior art of a one-piece, integral, die-cut and fold-line creased paperboard blank that will be manufactured into a collapsible container.

FIG. 6 shows prior art of a one-piece, integral, die-cut and fold-line creased paperboard blank 60, before being manufactured into a collapsed container, comprising a horizontal bottom means such as a bottom panel or bottom wall 62 whose opposing transversal edges are hinged by transversal fold-line creases 64, 64¹ to opposing end walls 66, 66¹. The horizontal bottom means 62 opposing longitudinal edges are hinged by longitudinal fold-line creases 68, 68¹ to opposing side walls 70, 70¹. The opposing corner end flaps 72, 72¹ are hinged by opposing longitudinal fold-line creases 68, 68¹ to the opposing end walls 66, 66¹ and are separated from the opposing side walls 70, 70¹ by die-cuts 76, 76¹. The opposing side walls 70, 70¹ have diagonal fold line creases 74, 74¹. The opposing corner end flaps 72, 72¹ have diagonal fold line creases 78, 78¹.

Figure 7:
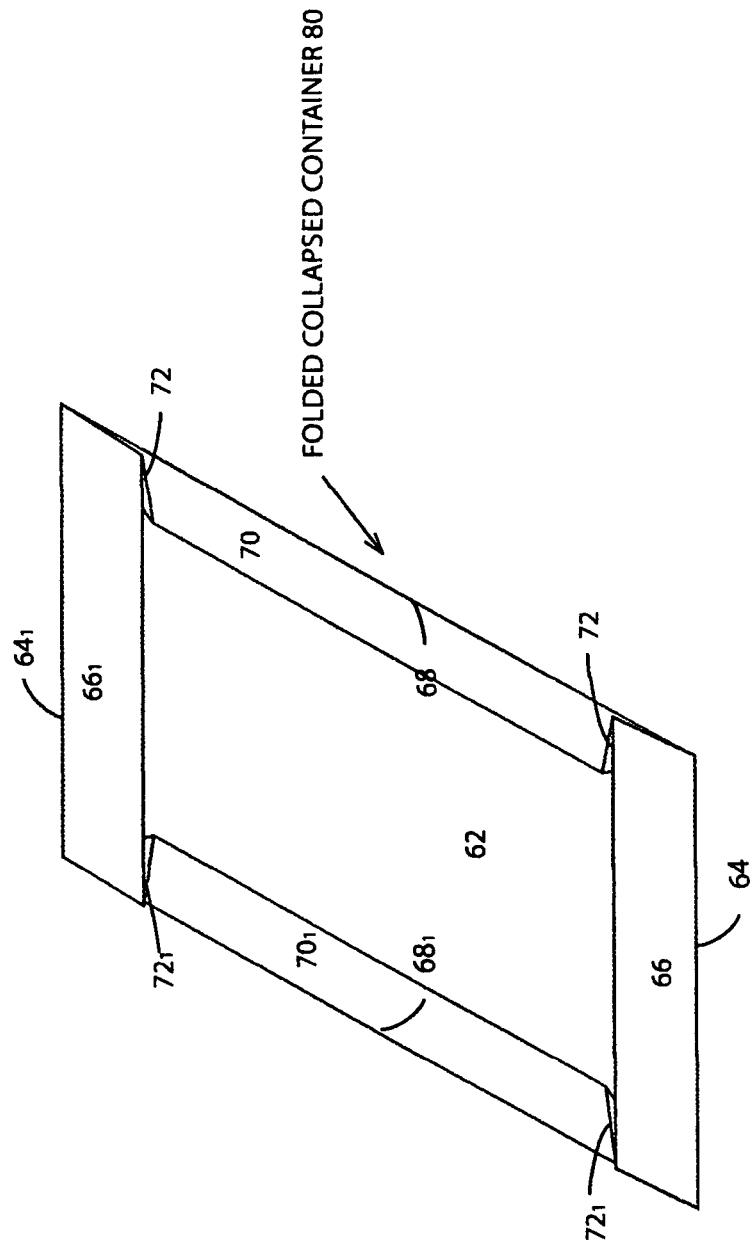
FIG. 7, illustrates FIG. 6, folded into a collapsed container without the embodiment.

FIG. 7 illustrates FIG. 6 folded smaller into folded collapsed container 80. The opposing side walls 70, 70¹ including the glued opposing corner end flaps 72, 72¹ are folded inwardly along opposing longitudinal fold-line creases 68, 68¹ for an extended length over and parallel the horizontal bottom means 62. The opposing end walls 66, 66¹ are folded inwardly along opposing transversal fold-line creases 64, 64¹ for an extended length over and parallel the folded opposing side walls 70, 70¹ including the glued folded opposing corner wall flaps 72, 72¹ and the horizontal bottom means 62 to make the folded collapsed container 80.

Figure 8:
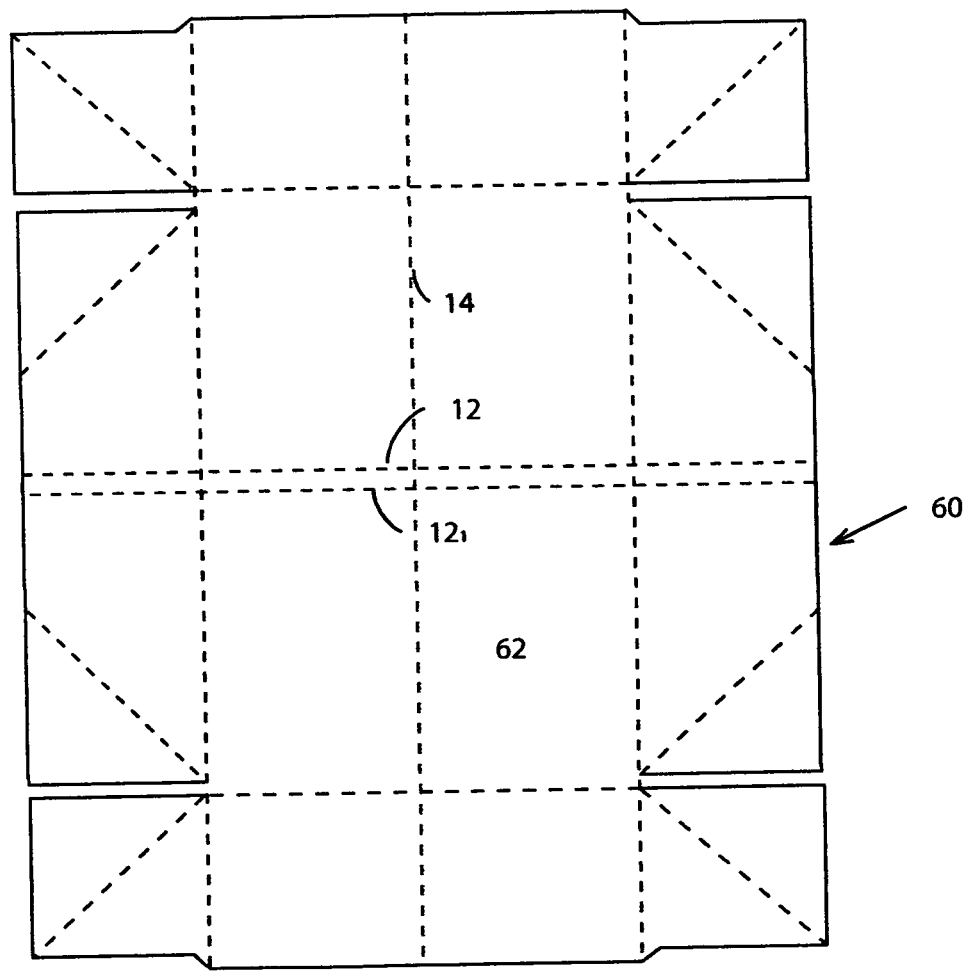
FIG. 8, illustrates the embodiment of the invention added to FIG. 6.

FIG. 8 illustrates the one-piece, integral, die-cut and fold line creased paperboard blank 60 as shown in FIG. 6 with the embodiment of the invention added consisting of the combination of one or more longitudinal fold line creases 14 and the opposing transversal fold line creases (12, 12¹) across a length and width of the blank 60 with the fold-line creases (14, 12, 12¹) being located in the center, or approximate center of the blank 60 and intersecting in the center, or approximate center of the bottom means 62.

FIG. 9A illustrates how the combination of the embodiment in FIG. 8 enables the folded collapsed container 80 in FIG. 7A to be further folded in-half or approximately in-half transversally along the longitudinal fold-line crease 14 into the book folded collapsed container 82.

FIG. 9B illustrates how the combination of the embodiment in FIG. 8, enables the book folded collapsed container 82 in FIG. 9A to be further folded in-half or approximately in-half longitudinally by folding along one or more transversal fold line creases 12, 12¹ to form the substantially smaller book folded portion collapsed container 84 that is one-half, or approximately one-half the size of folded portion 82 in FIG. 9A.

Figure 10:
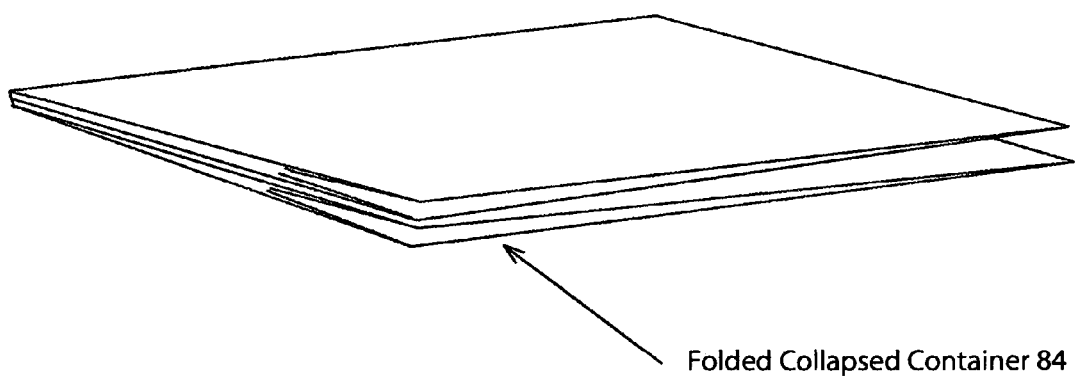
FIG. 10, illustrates FIG. 9B, completely folded collapsed container for packaging.

FIG. 10 illustrates FIG. 9B using the embodiment of the two transversal fold-line creases spaced close to one another, that is less than one-inch apart, in such a manner as to facilitate ease of folding folded portion 84 itself into a completely folded package identified as folded collapsed container 84.

While particular embodiments of the invention have been shown in the drawings and described above, it will be apparent that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A method of folding substantially smaller for packaging a one piece die-cut and creased paperboard blank, which can be assembled into a disposable cat litter box, the method comprising the steps of:
   (a) providing the one piece die-cut and creased paperboard blank having a bottom wall extending horizontally to bottom wall transversal fold-line creases and bottom wall longitudinal fold-line creases; a plurality of end walls integral to the bottom wall, each end wall having an integral upper end wall member with end wall securing devices and an end wall fold-line crease scored between the end wall and the upper end wall member, wherein the bottom wall transversal fold-line creases are scored between the bottom wall and the end walls; a plurality of side walls integral to the bottom wall, each side wall having an integral upper side wall member with side wall securing devices, a side wall fold-line crease scored between the side wall and the upper side wall member and corner end flaps with corner end flap securing devices, wherein the bottom wall longitudinal fold-line creases are scored between the bottom wall and the side walls, wherein the longitudinal fold-line creases are scored between the bottom wall and the side walls, wherein each of the corner end flaps having a corner end flap transverse fold-line crease scored between each of the corn end flap and each of the side walls; a plurality of die-cuts between the corner end flaps and the end walls; one or more longitudinal fold-line creases and one or more transversal fold-line creases across a length and a width of the blank approximately in a center of the blank and intersecting in the center of the blank; then
   (b) folding the plurality of end walls and the corner end flaps inwardly towards the bottom wall and along the bottom wall transversal fold-line creases to form bottom and end walls folded portions; then
   (c) folding the plurality of side walls and the upper side wall members inwardly towards the bottom wall and along the bottom wall longitudinal fold-line creases form bottom and side walls folded portions; then
   (d) folding one of the bottom and side walls folded portions inwardly along the one or more longitudinal fold-line crease towards the other one of the bottom and side walls folded portions to form a longitudinal folded portion; and then
   (e) folding the longitudinal folded portion in-half along the approximately centrally located transverse fold-line creases to form a transversal folded portion; wherein the completely folded blank is configured to be stock onto approximately one square foot of retail shelf space, and configured to be inserted and carried in a standard supermarket size plastic shopping bag for convenient.

2. A method of folding substantially smaller for packaging a one piece die-cut and creased paperboard blank, which can be assembled into a disposable cat litter box according to claim 1, wherein the step of providing the one piece die-cut and creased paperboard blank further includes the one or more transversal fold-line creases further defined by two fold-line creases disposed adjacent to one another at a distance less than one-inch apart to facilitate ease in folding the longitudinal folded portion into the transversal folded portion.

\* \* \* \* \*

UNITED STATES PATENT AND TRADEMARK OFFICE
CERTIFICATE OF CORRECTION

| | |
|---|---|
| PATENT NO. | : 8,869,744 B2 |
| APPLICATION NO. | : 13/374835 |
| DATED | : October 28, 2014 |
| INVENTOR(S) | : Wallace Noonan |

It is certified that error appears in the above-identified patent and that said Letters Patent is hereby corrected as shown below:

In the Specification

Figure 3A:
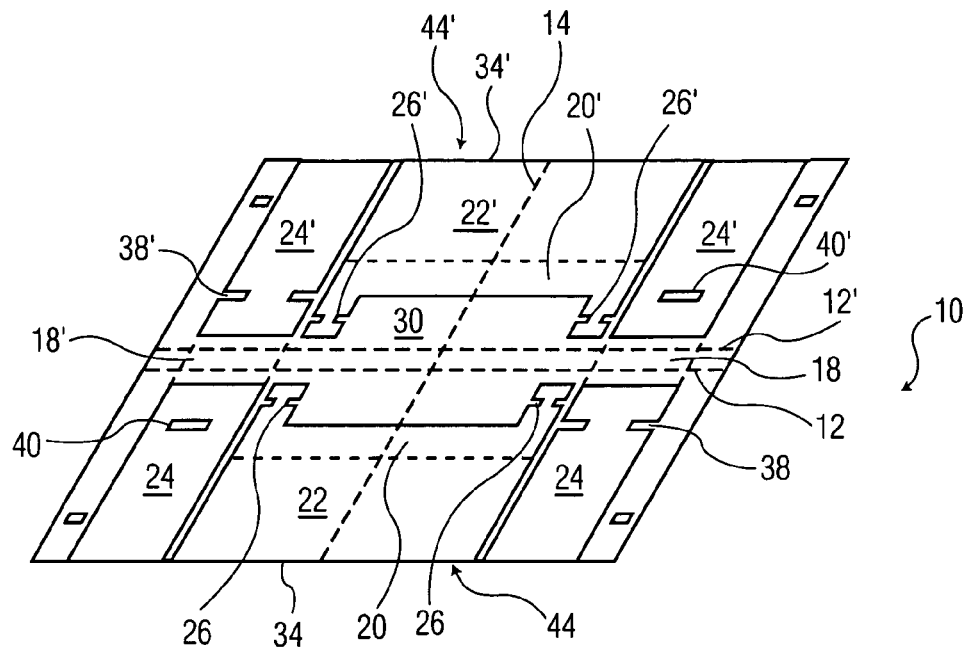

Delete Column 5, lines 41-42 and insert therefore the following:

-- Fig. 3 illustrates the embodiment of the invention added to Fig. 1.
Figs. 3A/3B illustrate the embodiment in folded portions 44, 44' and 46, 46'. --.

Delete Column 5, lines 43-46 and substitute therefore with the following:

-- Figs. 4A/4B illustrate the embodiment in folded portions 48 and 50. --.

Delete Column 5, lines 47-48 and substitute therefore with the following:

-- Fig. 5 illustrate the completely assembled cat litter box. --.

Column 6, lines 42-53, Fig 2B should read:

-- Fig 2B illustrates folding the preliminary fold in Fig 2A smaller, comprising side wall (18) including upper side wall member (16), securing device (42) and opposing folded corner end flaps (24, 24') (not visible) being folded inwardly along longitudinal fold-line crease (28) over and parallel an extended length of opposing folded portion (44, 44') to form folded portion (46). The opposing side wall (18) including upper side wall member (16), opposing securing device (42) and opposing folded corner end flaps (24, 24') (not visible) are folded inwardly along longitudinal fold-line crease (28) over and parallel an extended length of opposing folded portion (44, 44') to form folded portion (46'). --.

Column 6, line 63, prior to "FIG. 4A shows" insert following new paragraph:

-- Figs. 3A/3B illustrates Figs. 2A/2B with the embodiment of the invention in Fig. 3 added, Signed and Sealed this
Twenty-first Day of July, 2015

Michelle K. Lee
*Director of the United States Patent and Trademark Office* consisting of the combination of one or more longitudinal fold-line creases (14) and one or more transverse fold-line creases (12, 12') across a length and width of blank (10) with the fold-line creases (14, 12, 12') being located in the center, or approximate center of blank (10) and intersecting in the center or approximate center of the bottom wall (30) of blank (10) --.

Figure 3B:
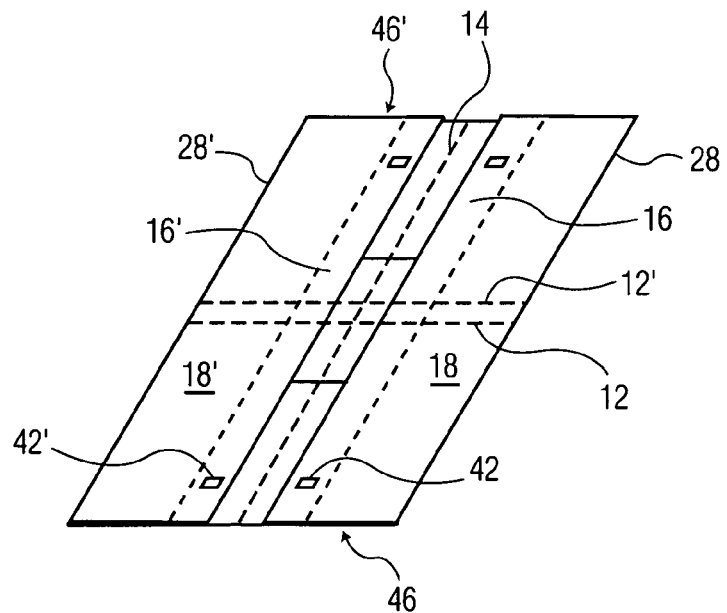

Column 6, line 63-Column 7, line 3, Fig 4A should read:

-- Fig. 4A illustrates how the combination of the embodiment in Fig. 3B enables the folded portions (46, 46') in Fig. 3B to be folded in-half transversly by folding folded portion (46) along longitudinal fold-line crease (14) inwardly over and parallel opposing folded portion (46) to form a book folded portion (48) that is one-half or approximately one-half the width of the combined folded portions (46, 46'). --.

Column 7, lines 4-9, Fig 4B should read:

-- Fig. 4B illustrates Fig. 4A using the embodiment's two transverse fold-line creases (12, 12') spaced close to one another, that is less than one inch apart, in such a manner as to facilitate ease of folding folded portion (48) itself into completely folded package identified as folded portion (50). --.

Column 7, lines 10-14, Fig 5 should read:

-- Fig. 5 illustrates the embodiment of the invention in the amended and erected cat litter box. --.